Feb. 17, 1959 J. M. MILNE 2,873,519
METHOD OF CONSTRUCTING A TANK FOR ELECTRIC APPARATUS
Filed July 21, 1954
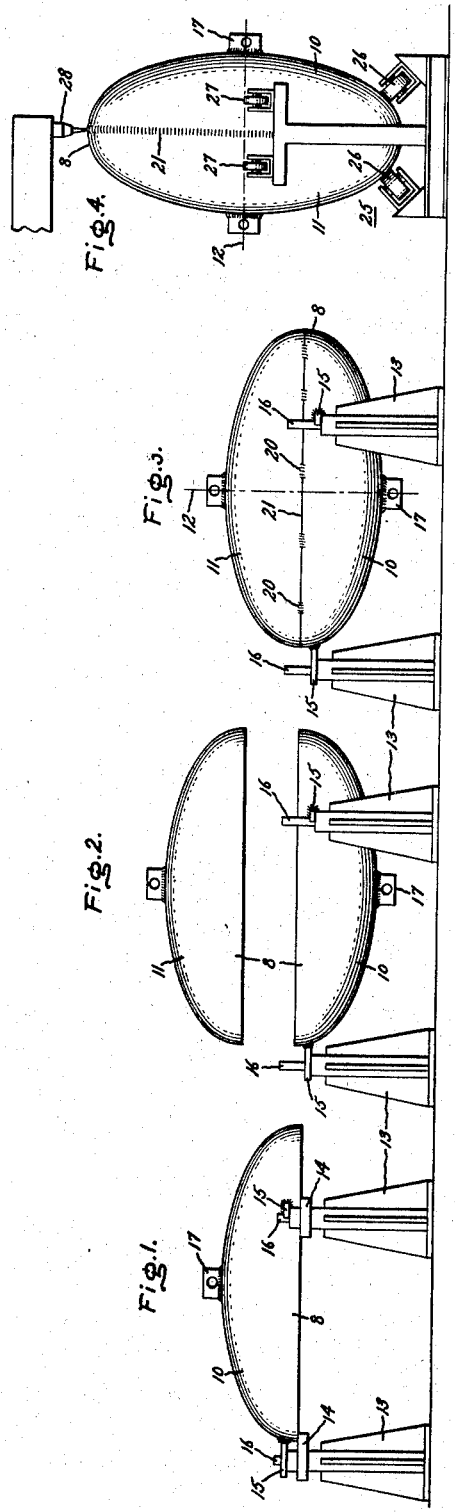
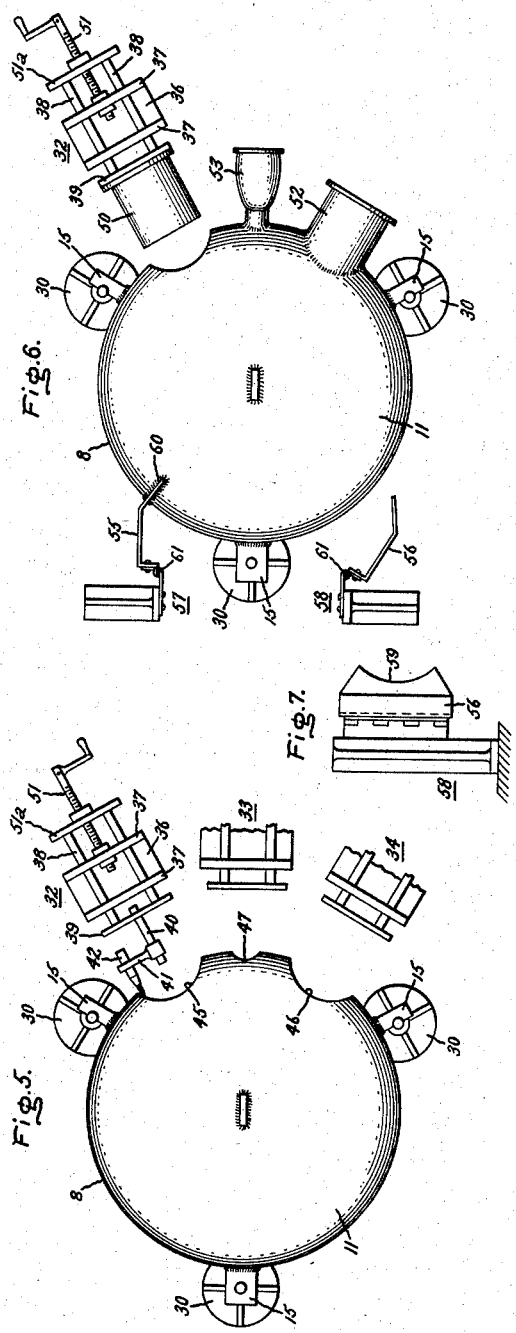
Inventor:
James M. Milne,
by *J. Wesley Faulkner*
His Attorney.

United States Patent Office 2,873,519
Patented Feb. 17, 1959

2,873,519

METHOD OF CONSTRUCTING A TANK FOR ELECTRIC APPARATUS

James M. Milne, Swarthmore, Pa., assignor to General Electric Company, a corporation of New York Application July 21, 1954, Serial No. 444,811

11 Claims. (Cl. 29—463)

This invention relates to an improved method of constructing a tank for electric apparatus and, more particularly, a tank of the type used in high voltage oil circuit breakers.

Heretofore, the tanks of large high-voltage circuit breakers have been constructed by methods which do not readily lend themselves to machine operations. Even the necessary manual operations have been quite cumbersome, and frequently it has been necessary to carry out these manual operations at inconvenient working levels where scaffolding was required. These difficulties have given rise to the undue consumption of time, labor, and floor-space and as a result, the building of these tanks has been an excessively expensive operation.

Accordingly, it is a primary object of my invention to construct a tank of a circuit breaker in such a manner that the major fabricating steps may be readily carried out either by machine or by simplified manual operations performed at a conveniently accessible working level.

A further object of my invention is to construct the tank in such a manner that a plurality of fabricating operations may be performed simultaneously. This not only permits tanks to be constructed at high speed but also permits a highly efficient utilization of the floor space required for the tank construction process.

A further object is to construct the tanks in such a manner that most of the fabricating steps for tanks of a given size may be carried out conveniently and precisely from preset jig structures. This minimizes the time required for preliminary adjustments of the fabricating tools.

Still another object is to eliminate the need for the time-consuming preliminary layout work which heretofore has been required as a prerequisite to incorporating the usual bushing housings into the tank assembly.

In accordance with one aspect of my invention, I construct the body of the tank by welding together the mating rims of a pair of similar metallic domes. The rims are of a circular configuration so that the resulting assembly has a generally circular periphery surrounding a central axis, which, in the finished product, lies horizontally. This assembly is then positioned, with the normally horizontal central axis extending generally vertically, in a location adjacent a plurality of preset jig structures horizontally-spaced about said periphery. About a horizontal working axis fixed with respect to one of the jig structures a reciprocable cutting torch is then rotated to cut a circular hole in said periphery. A cylindrical housing, which in the final tank receives a conventional high-voltage bushing, is positioned with its longitudinal axis coinciding with said horizontal working axis and is translated along this axis into a predetermined position with respect to said assembly, after which it is welded into said predetermined position. While this housing is being incorporated into the assembly at one of the jig structures, a suitable tank-supporting leg, pivotally suspended from another of the jig structures, may be fitted into mating relationship with the tank periphery and welded thereto. Other similar housings and supporting legs may be correspondingly mounted about said periphery at the same time that certain of the above operations are being performed.

For a better understanding of my invention, reference may be had to the accompanying drawing wherein Figs. 1, 2, 3 and 4 are elevational views illustrating successive steps in the formation of an ellipsoidally-configured tank body for a circuit breaker, whereas Figs. 5 and 6 are plan views illustrating subsequent steps which are involved in mounting certain components of the breaker about the periphery of the tank body. Fig. 7 is an elevational view of a portion of the structure of Fig. 6.

As illustrated more particularly in Figs. 2, 3, and 5, the principal components of the tank are a pair of similar metallic domes 10 and 11. Each of these domes has a circular rim 8 and is preferably of a semi-ellipsoidal configuration. These domes, when united at their rims, form an assembly of ellipsoidal configuration having a generally circular periphery extending about a central axis 12.

The first step in the formation of this assembly is illustrated in Fig. 1 wherein one of the domes 10 is supported, with its convex side up, from a plurality of vertically-extending pedestals 13. Preferably, I utilize three such pedestals disposed in spaced relationship about the circular periphery of the dome. The pedestals are of such a height that the rim of the dome is located at a convenient working level. For actually mounting the dome 10 on the pedestals, suitable inwardly projecting supporting adapters 14 removably secured to the pedestals are provided. With the dome supported in position on these adapters, a plurality of apertured leveling lugs 15 are then welded about the dome periphery in general angular alignment with suitable positioning rods 16 projecting from the pedestal structures. Preferably, the leveling lugs 15 are disposed in a common horizontal plane.

After this first step has been completed, the dome 10 is then lifted from the pedestals by suitable means (not shown) acting through an appropriate lifting lug 17. Then, after the adapters 14 have been removed from the pedestals, the dome 10 is inverted and returned to a supported position on the pedestals, as shown in Fig. 2. In this supported position of Fig. 2, the leveling lugs 15, which previously had been secured in angular alignment with respect to the positioning rods 16, are utilized to support the rim of dome 10 at about the same convenient working level as shown in Fig. 1. In order that the lugs align with the positioning rods 16 when the tank is inverted, the positioning rods, and hence the lugs 15, are symmetrically disposed with respect to a diametrical axis of the dome. As illustrated in Fig. 2, after the inverted first dome 10 has been returned to the pedestals 13, the other dome 11 is seated thereon with its rim in matching registry with the rim of the first dome. As may be seen from Fig. 3, the domes are then tack-welded together as at 20 along the circular peripheral seam 21. The resulting ellipsoidal assembly formed by so uniting the domes 10 and 11 is then removed from the pedestals.

As shown in Fig. 4, this assembly is thereafter positioned in an automatic welding machine 25 with its central axis 12 disposed generally horizontally. This welding machine 25 comprises suitable pairs of positioning rollers such as 26 and 27 mounted to embrace the circular peripheral area of the assembly 10, 11. Because this generally circular configuration of the peripheral area has been preserved up to this point, the assembly readily lends itself to rotation about its central axis 12. Thus, by simply driving one or more pairs of the rollers by suitable power means (not shown), the assembly may be rotated at will about its central axis 12. As the assembly is so rotated a welding gun 28 positioned adjacent the uppermost peripheral area of the assembly is operated to apply a carefully-controlled, highly effective weld to the peripheral seam 21. Because of the circular configuration of the seam 21, few, if any, adjustments of the gun 28 are required as the assembly is rotated past the gun. Because I am able to position the assembly 10, 11 with its axis disposed horizontally, as shown in Fig. 4, the welding gun may be located directly above the joint being welded, which is an ideal location from the standpoint of providing a strong, uniform weld.

After the welding operation of Fig. 4 has been completed, the assembly is removed from the welding machine 25, is returned to its side, and in this position is mounted on vertically-extending pedestals 30 relatively-spaced in the same manner as the pedestals 13 of Fig. 1. These pedestals 30 are of a height such as to again position the peripheral area of the assembly at a conveniently accessible working level. A group of preset jig structures 32, 33, and 34 fixedly located adjacent periphery of the assembly, are utilized to support suitable fabricating tools thereafter used for incorporating additional circuit breaker tank components into the assembly. As will soon be explained more particularly in connection with Fig. 6, these additional components include the tubular housings 50, 52 for the usual high voltage bushings and the casing 53 for the usual circuit breaker mechanism. The above-mentioned jig structures 32 and 34 are generally identical and are used for the tubular housings 50, 52 whereas the jig structure 33, which is similar to the other jig structures, is used for the casing 53.

The jig structure 32 comprises a fixed frame 36 including projecting flanges 37 having suitable openings therein through which reciprocable guide rods 38 slidably extend. An adapter plate 39 fixed to the inner ends of the guide rods contains a tool-receiving opening, the axis of which is located at the same height as the peripheral seam. Within this opening, one end of an elongated torch-supporting rod 40 is removably supported. At the other end, the rod 40 carries a rotatable arm 41 suitably journaled thereon. Reciprocably mounted at the outer end of this arm is a conventional cutting torch schematically shown at 42.

By rotating this cutting torch 42 about the rod 40 and by suitably reciprocating it with respect to the arm 41 as it is being so rotated, a circular opening 45 may be quickly and precisely cut in the peripheral region of the body assembly. If the circular configuration of the opening 45 should become distorted, as from the release of internal stresses within the tank metal while the cutting operation is taking place, this configuration may easily be restored simply by again operating the guided torch over the same circular path.

Heretofore, in order to provide correctly located openings of this type in the non-planar surfaces of a comparable tank, it has been necessary to resort to tedious, time-consuming manual layout work, followed by a cutting operation performed by a manually supported torch. If the opening should become distorted during this cutting operation, it has been necessary to again layout on the tank surface the correct path for the torch as a prerequisite to repeating the manual cutting action. This time-consuming series of operations has been still further complicated by the fact that frequently, at this stage of the construction process, the tank had been set upright upon its feet. As a result, these openings would be located at inaccessible working levels where scaffolding was required.

In contrast to the cumbersome nature of this operation as practiced in the prior art, it is necessary in the method of my invention merely to rotate the torch 42 about the horizontal axis provided by the rod 40 while suitably reciprocating it into the correct cutting position, as previously described. No preliminary layout work is required; distortion may be easily corrected without the necessity of relayout merely by repeating the simple initial operation; and the operation may be carried out at a conveniently accessible working level.

Once the cutting operation for the opening 45 has been completed, the torch assembly 40—42 may be transferred to the jig 34, and the same operation repeated for a similar opening 46. A similar torch assembly (not shown) applied in the same manner to jig structure 33 may be correspondingly operated to form a central opening 47.

When at least the opening 45 has been provided and the torch has been removed from adapter 39, the cylindrical housing 50 (Fig. 6) is suitably clamped to the adapter in such a location that its longitudinal axis coincides with the horizontal working axis about which the cutting torch was previously rotated. This cylindrical housing, in the final tank, is used for enclosing one of the usual pair of high voltage bushings which extend divergently through the top of the tank. When the housing 50 has been so mounted, it is then translated along the aforesaid working axis toward a predetermined desired position with respect to the tank assembly 10, 11. This translation is carried out by means of a jack screw 51 suitably coupled to the guide rods 38 through a suitable crosshead 51a, as shown. When the housing has been located in its predetermined desired position, the contour of the periphery of opening 45 is then marked off on the inner end of housing 50. The housing is then withdrawn outwardly along the horizontal working axis, after which it is suitably trimmed along the marked-off path, as by a cutting torch. Thereafter, the housing is returned to the predetermined desired position, where it is suitably welded to the matching periphery of the tank assembly. During this entire series of fitting, trimming, and welding operations the housing had remained clamped in correct axial alignment on the jig carriage and, consequently, no time-consuming intermediate adjustments were necessary. A similar series of fitting, trimming and welding operations are performed for the components which are applied to the other openings 46 and 47. In Fig. 6, one of the bushing housings 52 and the casing 53 are shown welded into their final assembly position. It is to be noted that in accordance with my invention each of aforementioned fitting, trimming and welding operations are performed at a conveniently accessible working level.

At the same time as the components 50, 52, 53 are being incorporated into one side of the tank assembly, steps may be taken to mount suitable tank-supporting legs at the other side of the assembly. More particularly, as shown in Figs. 6 and 7, the tank-supporting legs 55 and 56 are first pivotally mounted about vertical axes 61 provided by suitable jig structures 57 and 58 located adjacent the tank periphery. As illustrated in Fig. 7, each of these tank-supporting legs has a recessed portion 59 precut with a contour generally conforming to a section of the tank periphery. Since it is impractical to precut this recessed portion so that it will exactly fit the tank periphery, certain final fitting operations are nearly always required to obtain a fit which is close enough for an effective welding operation. To this end, the illustrated jig structure permits each of the legs to be swung into engagement with the tank periphery, at which time, the interfering surface areas of the leg can be detected and marked, after which the leg is swung away from the periphery, and, while still mounted on the jig, the interfering surface areas are suitably trimmed off or burned away. After this series of operations, which incidentally may be repeated as many times as necessary, the leg finally is swung back into matching engagement with the periphery and is welded thereto as shown at 60 in Fig. 6. It is to be noted that this entire series of operation takes place at a conveniently accessible working level. No intermediate adjustments of the legs are necessary because the foot of each leg has remained during this entire period in a fixed position of adjustment on its jig, which position is at the correct ground level with respect to the tank body.

After the legs 55, 56, the bushing housings 50, 52 and the casing 53 are assembled in place as described above, the tank may then be placed in an upright position upon its supporting legs 55, 56, after which any remaining tank fabricating steps can be performed. These latter steps are usually of a minor nature in comparison to those above described.

While I have shown and described a particular method of my invention, it will be obvious to those skilled in the art that various modifications may be made without departing from my invention in its broad aspects. I, therefore, intend in the appended claims to cover all such modifications as fall within the true spirit and scope of my invention.

What I claim as new and desire to secure by Letters Patent of the United States:

1. A method of constructing a tank for electrical apparatus comprising the following steps: providing a pair of domes having mating rims, welding together said mating rims along a peripheral seam, positioning said assembly adjacent a preset jig structure with said peripheral seam disposed in a generally horizontal plane, cutting a circular hole in a non-planar portion of said periphery by cutting means guided for reciprocation and rotated about a horizontal axis fixed with respect to said jig structure, positioning a cylindrical housing with its longitudinal axis coinciding with said horizontal axis, translating said housing along said horizontal axis into a predetermined position with respect to said assembly and thereafter welding said housing in said predetermined position.

2. The method of claim 1 in which said domes have circular rims and said assembly has a generally circular periphery; in which said cutting means comprises torch means; in which positioning of said cylindrical housing is effected by positioning said housing on said jig structure; and in which translation of said housing is effected while said housing is positioned on said jig structure.

3. A method of constructing a tank for a circuit breaker comprising the following steps: supporting a first circular dome with its concave side up, positioning a second circular dome with its convex side up in registry with said first dome and tack welding said domes together whereby to form an assembly having a circular periphery extending about a central axis, positioning said assembly so that said axis is generally horizontal and then rotating said assembly about said axis while seam welding the domes together, the welding operation being performed from a station located adjacent the uppermost peripheral area of the assembly, re-positioning said assembly with its axis extending generally vertically, cutting a plurality of circular holes in said periphery by torch means rotated about generally horizontal axes, inserting tubular housings into said circular holes and welding said housings in position.

4. A method of constructing a tank for a circuit breaker comprising: supporting a first circular dome with its concave side up, positioning a second circular dome in registry with said first dome and tack welding the domes together whereby to form an assembly having a circular periphery extending about a central axis, positioning said assembly with said axis disposed generally horizontally and thereafter rotating said assembly about said axis while seam welding together said domes along said circular periphery, re-positioning said assembly with said axis extending generally vertically, cutting a circular hole in a non-planar portion of said periphery by cutting means guided for reciprocation and rotated about a generally horizontal working axis fixed with respect to said assembly, positioning a cylindrical housing with its longitudinal axis coinciding with said working axis, translating said housing along said working axis into a predetermined position with respect to said assembly, and thereafter welding said housing in said predetermined position.

5. A method of constructing a tank comprising the following steps: supporting a first circular dome near its outer periphery with its concave side up, positioning a second circular dome upon the first dome with the periphery of said second dome in alignment with the periphery of said first dome and tack welding the domes together at their outer peripheries whereby to form an assembly having a circular periphery extending about a central axis, positioning said assembly with said axis disposed generally horizontally and thereafter rotating said assembly about said axis while seam welding together said domes along said circular periphery, the welding operation being performed from a station located adjacent the uppermost peripheral area of the assembly, and then incorporating radially outwardly projecting components in said circular periphery.

6. A method of constructing a tank for a circuit breaker comprising the following steps: supporting a first circular dome with its concave side up, positioning a second circular dome in registry with said first dome and tack welding the domes together whereby to form an assembly having a circular periphery extending about a central axis, positioning said assembly with said axis disposed generally horizontally and thereafter rotating said assembly about said axis while welding together said domes along said circular periphery, then positioning said assembly adjacent a fixed jig structure with its axis extending generally vertically, cutting a circular hole in a non-planar portion of said periphery by torch means guided for reciprocation and rotated about a generally horizontal axis fixed with respect to said jig structure, positioning a cylindrical housing on said jig structure with its longitudinal axis coinciding with said generally horizontal axis, translating said housing while positioned on said jig structure along said generally horizontal axis into a pre-determined position with respect to said assembly, and thereafter welding said housing in said predetermined position.

7. A method of constructing a tank comprising: providing a pair of similar domes having mating rims, welding said rims together along a peripheral seam, positioning the resulting assembly with said seam disposed in a generally horizontal plane, providing a tank-supporting leg having a recessed portion contoured to generally conform to a peripheral section of said assembly, pivotally mounting said leg about a vertical axis fixed with respect to said assembly, swinging said leg about said axis into a position wherein said recessed portion generally mates with said peripheral section, retracting said leg about said axis and trimming off non-conforming areas of said recessed portion, thereafter swinging said leg about said axis into engagement with said assembly, and then welding said leg to said assembly.

8. A method of constructing a tank comprising: supporting a first dome with its convex side up on a plurality of vertically-extending pedestals spaced about the periphery of said dome in locations which are symmetrical with respect to a diametrical axis of the dome, welding a plurality of lugs to said dome in a common horizontal plane in general angular alignment with respect to said pedestals, inverting said dome and supporting it from said pedestals by means of said lugs, positioning a second dome in registry with said first dome and thereafter welding said domes together, and then securing at least one horizontally-extending component to the periphery of said assembly while said assembly is supported on said lugs with said common plane disposed horizontally.

9. A method of constructing a tank comprising: providing a first dome having a circular rim, supporting said dome with its convex side up on a plurality of vertically-extending pedestals spaced about said rim in locations symmetrical with respect to a diametrical axis of said dome, welding a plurality of lugs to said dome in a common horizontal plane in general angular alignment with said pedestals, inverting said dome and supporting it from said pedestal by means of said lugs, positioning a second dome similar to the first dome with its rim in registry with the rim of said dome and tack-welding said domes together thereby to form a tank having a generaly circular periphery, positioning said assembly with said circular periphery disposed in a generally vertically extending plane and thereafter rotating said assembly about a central axis while welding together said domes along said periphery, then supporting said assembly on said lugs with said common plane disposed horizontally, and thereafter securing to the periphery of said assembly at least one radially projecting component having its longitudinal axis extending horizontally.

10. A method of constructing a tank for electrical apparatus comprising: providing an assembly having a non-planar surface area, positioning said assembly with said non-planar surface area disposed adjacent a preset jig structure, cutting a circular hole in said non-planar surface area by cutting means guided for reciprocation and rotated about a fixedly located working axis defined by said jig structure, positioning a cylindrical housing on said jig structure with its longitudinal axis coinciding with said axis, translating said housing while positioned on said jig structure along said working axis into a predetermined position with respect to said assembly and thereafter securing said housing in said pre-determined position.

11. The method of claim 10 in which said working axis is generally horizontally disposed; in which said cutting means comprises torch means; and in which securing of said housing to said assembly is by means of a welding operation.

References Cited in the file of this patent
UNITED STATES PATENTS

| | | |
|---|---|---|
| 1,798,190 | Carter | Mar. 31, 1931 |
| 1,937,604 | Taylor | Dec. 5, 1933 |
| 1,965,736 | Dillman | July 10, 1934 |
| 2,040,240 | Coberly | May 12, 1936 |
| 2,113,060 | Sandberg | Apr. 5, 1938 |
| 2,226,496 | Jacocks | Dec. 24, 1940 |
| 2,287,197 | Sandberg | June 23, 1942 |
| 2,346,423 | Gray | Apr. 11, 1944 |
| 2,412,972 | Dean | Dec. 24, 1946 |
| 2,439,266 | Settle | Apr. 6, 1948 |
| 2,474,149 | Hume | June 21, 1949 |
| 2,511,553 | Toops | June 13, 1950 |
| 2,568,512 | Reilly | Sept. 18, 1951 |